United States Patent

[11] 3,573,756

[72] Inventors Durrell W. Hillis;
Thomas W. Hart, Jr., Phoenix, Ariz.
[21] Appl. No. 728,691
[22] Filed May 13, 1968
[45] Patented Apr. 6, 1971
[73] Assignee Motorola, Inc.
Franklin Park, Ill.

[54] ASSOCIATIVE MEMORY CIRCUITRY
8 Claims, 3 Drawing Figs.

[52] U.S. Cl. ........ 340/173, 307/238, 340/172.5
[51] Int. Cl. ........ G11c 11/40, G11c 15/00
[50] Field of Search ........ 340/173; 307/238, 279

[56] References Cited
UNITED STATES PATENTS

| | | | |
|---|---|---|---|
| 3,218,613 | 11/1965 | Gribble | 307/238 |
| 3,284,782 | 11/1966 | Burns | 340/173 |
| 3,363,115 | 1/1968 | Stephenson | 340/173 |
| 3,490,007 | 1/1970 | Igarashi | 340/173 |

*Primary Examiner*—Terrell W. Fears
*Attorney*—Mueller and Aichele

ABSTRACT: An associative memory cell comprising a memory circuit and an association circuit. The memory circuit includes first and second transistors cross coupled in a bistable circuit configuration so that the first and second transistors alternately conduct as the cell is switched from one to the other of its two stable conductive states. An association current switching circuit is connected between the memory circuit and an associative sense terminal and is further connected to a sense-write circuit. The association circuit is responsive to the conductive state of the memory circuit and to the conductive state of the sense-write circuit to either conduct current from the associative sense terminal or remain nonconductive and thereby indicate association between the sense-write circuit and the memory cell.

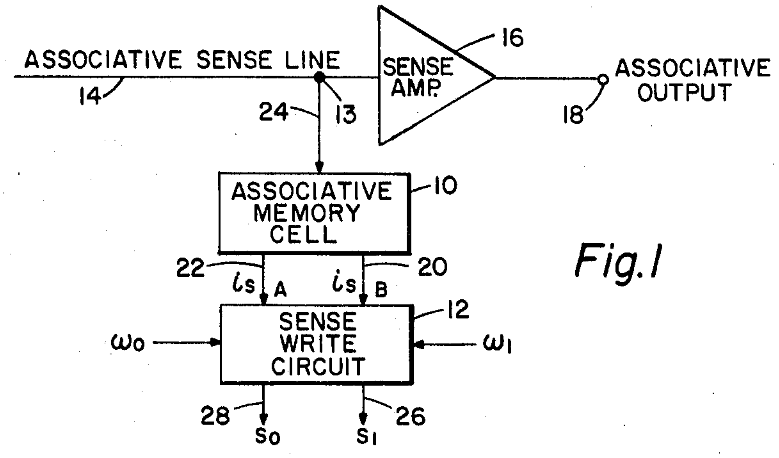
Fig. 1
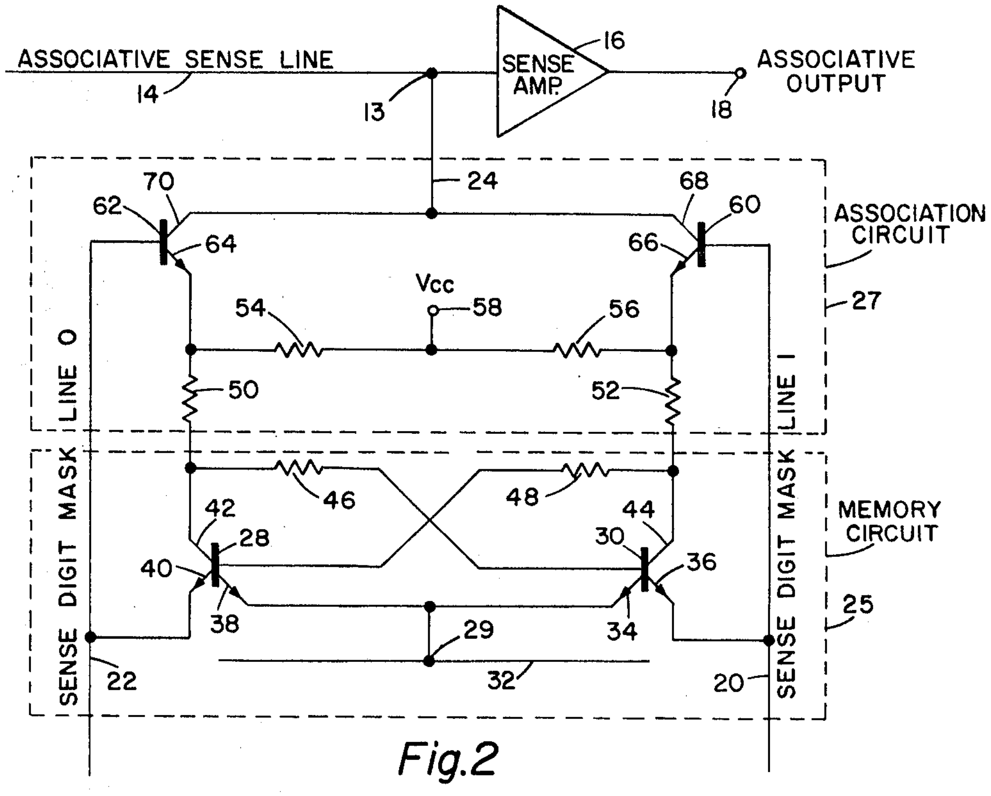
Fig. 2
| $\omega_0$ | $\omega_1$ | A | B | SENSE OUTPUTS |
|---|---|---|---|---|
| 0 | 0 | Undefined | | Don't Care |
| 0 | 1 | 1 $V_{BE}$ | 3 $V_{BE}$ | Don't Care |
| 1 | 0 | 3 $V_{BE}$ | 1 $V_{BE}$ | Don't Care |
| 1 | 1 | 2 $V_{BE}$ | 2 $V_{BE}$ | $S_0$, $S_1$ = Open if $i_s < t$<br>$S_0$ or $S_1$ = $V_{SAT}$ if $i_s > t$ |
Fig. 3
INVENTORS
Thomas W. Hart Jr.
Durrell W. Hillis
BY
Mueller, Aichele & Rauner
ATTY'S.

ASSOCIATIVE MEMORY CIRCUITRY

BACKGROUND OF THE INVENTION

This invention relates generally to digital memory circuits and more particularly to an associative memory cell which can be fabricated in monolithic integrated form.

One type of prior art digital memory cell which has been used in large scale integration (LSI) memories includes a pair of multiemitter transistors cross coupled in a bistable circuit configuration so that the cell may be switched from one to the other of its two conductive states upon the proper application of signals to the transistor emitters. For example, one emitter of each transistor in the cell is commonly connected to a word select line and the other emitter of each transistor is commonly connected to sense digit lines. As long as the potential on the word select line is maintained below a predetermined level, the state of the cell will remain fixed and cannot be changed by signals on the sense digit lines. However, when the word select line potential is switched to a predetermined level, differential data applied to the sense digit lines will switch the cell from one to the other of its two binary states. These states are commonly referred to as the binary one and the binary zero states.

When this two-transistor prior art memory cell is connected to sense-write circuitry and conductively controlled thereby in LSI memory systems, it is frequently desired to ascertain the association between the memory cell and the sense-write circuit. That is, it is frequently desired to ascertain whether the binary state of the memory cell matches the binary state of the sense-write circuit or whether there is a mismatch between the two. This exclusive OR function is commonly referred to in the art as performing association.

When it is desired to perform this association using the prior art memory cell described above, it is necessary to connect an array of logic gates to the output terminals of the sense-write circuit and of the memory cell. For example, one such type of logic gate connection for indicating association includes the connection of one output terminal of both the sense-write circuit and the memory cell to one AND gate and the other output terminal of both the sense-write circuit and the memory cell to another AND gate. The outputs of these two AND gates must be connected to an OR gate which, in turn, will produce an exclusive OR output signal indicative of the association between the conductive states of the sense-write circuit and the memory cell. Thus, three logic gates are required in order that the association between the sense-write circuit and the storage cell can be determined. In memory systems used in computers and the like, the requirement for these additional logic gates to perform association is disadvantageous because of added circuit delays, cost, space and increased system complexity.

SUMMARY OF THE INVENTION

An object of this invention is to provide a new and improved associative memory cell which produces an associative output signal with a minimum number of electronic components.

Another object of this invention is to provide a simple associative memory cell wherein current switching means are connected to a simple memory circuit and are compatible therewith in monolithic integrated circuit fabrication and operation.

A further object of this invention is to provide an associative memory cell which is easy to fabricate in monolithic integrated form, which requires a minimum number of resistors and transistors, and which requires a minimum number of output pins for the complete integrated circuit package for the cell.

Briefly described, the present invention features a memory cell having first and second multiemitter transistors cross coupled in a basic memory circuit for bistable switching operation. The multiemitter transistors are connected to word select and sense-write circuitry which control the binary state of the cell. Third and fourth transistors are connected in an association circuit between an associative sense terminal and the first and second transistors of the memory cell, respectively, and the third and fourth transistors are further connected to the sense-write circuitry. The association circuit is conductively controlled by the conductive states of the sense-write circuitry and the basic memory circuit to indicate association between the two.

The above and other objects and features of this invention will become more readily apparent and understood from the following description of the accompanying drawings.

IN THE DRAWINGS

FIG. 1 is a block diagram of the associative memory cell according to this invention and illustrates the connection of this cell between an associative sense line and the sense-write circuitry with which it operates;

FIG. 2 is a schematic diagram of the associative memory cell according to this invention; and FIG. 3 is a truth table indicating the sense outputs of the sense-write circuit in FIG. 1 in response to different binary input combinations applied to the sense-write circuit.

DESCRIPTION OF THE INVENTION

Referring in detail to the accompanying drawings, there is shown in FIG. 1 an associative memory cell 10 connected between a sense-write circuit 12 and an associative sense line 14. A sense amplifier 16 is connected between the associative sense terminal 13 and associative output terminal 18 to provide an amplified output signal indicating the association between cell 10 and sense-write circuit 12. A conductor 24 connects the associative sense terminal 13 with the associative memory cell 10 and provided input current to cell 10 when there is a mismatch between the conductive states of the cell 10 and the sense-write circuit 12. Sense-digit-mask lines 22 and 20 interconnect the cell 10 and the sense-write circuit 12, and these lines either conduct current from the memory cell 10 to the sense-write circuit 12 or conduct differential data signals from the sense-write circuit 12 to the memory cell 10, to change the conductive state of cell 10 or to interrogate the cell for association. Binary inputs $W_1$ and $W_0$ are connected to the sense-write circuit 12, and binary output signals $S_0$ and $S_1$ are derived at output terminals 28 and 26, respectively, of the sense-write circuit 12. The operation of the system illustrated in block diagram in FIG. 1 will be better understood from the following description of the associative memory cell in FIG. 2. The individual components of FIG. 2 will be initially identified and thereafter the operation of this cell will be explained.

The associative memory cell in FIG. 2 can be divided into a memory circuit 25 and an association circuit 27. The memory circuit 25 in FIG. 2 is not new per se. However, the combination of this memory circuit 25 and the association circuit 27 and the particular interconnections between the association and memory circuits to provide an associative output signal is new. The memory circuit 25 includes multiemitter transistors 28 and 30 which are cross connected base-to-collector via resistors 48 and 46 in a bistable circuit configuration. First input or emitter electrodes 34 and 38 of the first and second transistors 28 and 30, respectively, are connected to a select input terminal 29 to which select signals are applied. Second input or emitter electrodes 40 and 36 of the first and second transistors 28 and 30, respectively, are connected to the sense-digit-mask lines 22 and 20 which interconnect the associative memory cell 10 to the sense-write circuit 12. The collectors 42 and 44 of the first and second transistors 28 and 30 are connected through level shifting resistors 50 and 52 to third and fourth transistors 62 and 60, respectively, in the association circuit 27. Resistors 54 and 56 interconnect the power supply $V_{cc}$ applied to terminal 58 to the association and memory circuits 27 and 25.

The third and fourth transistors 62 and 60 in the association circuit 27 provide a means for switching current from the associative sense line 14 to indicate a mismatch between the binary conductive states of the associative memory cell 10 and the sense-write circuit 12. The first and second transistors 62 and 60 remain nonconductive when there is a match between the binary conductive states of the associative memory cell 10 and the sense-write circuit 12. The performance of this association function will be described below with reference to circuit operation.

OPERATION

The operation of the associative memory cell 10 in FIG. 2 will be described with respect to the following functions: (1) indicating association between the memory cell 10 and the sense-write circuit 12; (2) reading the state of the memory circuit 10, (3) writing into the associative memory cell 10; and (4) masking or inhibiting the associative memory cell 10.

Assume that it is desired to determine the association between the associative memory cell 10 and the sense-write circuit 12. The memory circuit 25 will arbitrarily be assigned a binary one condition when first transistor 28 is conducting and the second transistor 30 is nonconductive, and the sense-write circuit 12 will arbitrarily be assigned a binary one condition when the sense-digit-mask line 22 is low at $1V_{BE}$ (one base emitter PN junction drop) and the sense-digit-mask line 20 is high at $3V_{BE}$. The word select line 32 is at $1V_{BE}$ when the cell 10 is unselected and at $3V_{BE}$ when the cell 10 is selected. In performing association, cell 10 is unselected so that the select terminal 29 is at $1V_{BE}$. With the first transistor 28 conducting, the collector 42 thereof is at $1V_{BE}+V_{CE(SAT)}$ (collector-emitter saturation voltage of transistor 28), and the emitter 64 of the third transistor 62 is at $1V_{BE}+V_{CE(SAT)}+IR(50)$ (voltage drop across resistor 50 which is typically in order of 0.4 volts). Therefore, the third transistor 62 is reversed biased and is nonconductive when the cell 10 is in a binary one state and when the sense-write circuit 12 is in a binary one state, i.e., with line 22 low and line 20 high.

For the above conditions, the base of the first transistor 28 is at $2V_{BE}$ and the emitter 66 of the fourth transistor 60 is at $2V_{BE}+IR(48)+R(52)]$. Therefore, the fourth transistor 60 will likewise be reversed biased and nonconducting for the above assumed binary states of the cell 10 and sense-write circuit 12. With both transistors 60 and 62 nonconducting, there is no current flowing through associative sense terminal 13 to line 24, and this indicates a match between cell 10 and sense-write circuit 12.

Assume now that there is a mismatch between the cell 10 and the sense-write circuit 12, that the sense-digit-mask line 22 is high at $3V_{BE}$ and that sense-digit-mask line 20 is low at $1V_{BE}$. Now, with the base of the third transistor 62 at $3V_{BE}$ and the emitter 64 of the third transistor 62 at $1V_{BE}+V_{CE(SAT)}+IR($50ch, the third transistor 62 is forward biased into conduction and current flows from the associative sense terminal 13 through line 24 and into the collector 70 of the third transistor 62. This current flow out of the associative sense terminal 13 causes the sense amplifier 16 to indicate a mismatch between the conductive states of the cell 10 and the sense-write circuit 12. The sense-digit-mask line 20 is now at $1V_{BE}$ and the fourth transistor 60 remains nonconductive with its emitter-base junction reverse biased.

When it is desired to sense (read) the binary conductive state of the associative memory cell 10, the select line 32 is raised to $3V_{BE}$ to force current to flow in the other or second input electrode 40 of the previously conducting transistor 28. This action causes current to flow from the emitter 40 and through the sense-digit-mask line 22 to the sense-write circuit 12. The sense-write circuit 12 is functionally operative to sense the binary one conductive state and respond by producing the appropriate output signals at output terminals 26 and 28. During sensing or reading of the cell 10, the data lines 20 and 22 are quiescent and are held at a potential which is greater than $1V_{BE}$ and less than $3V_{BE}$.

When it is desired to write data into the associative memory cell 10, the select line 32 is raised high to $3V_{BE}$ and differential data is applied to the second input electrodes 40 and 36 of the memory circuit 25. In order to change the binary conductive state of the cell 10, this data must raise the base voltage of the previously nonconducting transistor 28 or 30 to a value sufficient to bias that transistor into conduction and in turn, turn off the previously conducting transistor.

When the memory cell 10 is connected in a large array of similar cells, each of which stores information relating to a certain person or thing, it is frequently desired to inhibit or "-mask" a cell when the information stored in that particular cell is of no interest. When this situation arises, the sense-digit-mask lines 20 and 22 are held at a potential less than $2V_{BE}+V_{CE(SAT)}+IR($50 to prevent the third and fourth transistors 62 and 60 from turning on. In this manner the cell 10 is forced to indicate association, and masking as well as sensing can be performed with the data lines 22 and 20 at the same potential, an advantageous feature of this invention.

The truth table shown in FIG. 3 indicates the binary sense outputs $S_0$ and $S_1$ at terminals 28 and 26 as a function of the write inputs $W_1$ and $W_0$ applied to the sense-write circuit 12 as shown. When both write inputs $W_1$ and $W_0$ are low, the outputs $S_0$ and $S_1$ at terminals 23 and 26 are undefined. When one write input $W_1$ or $W_0$ is low and the other of these two write inputs is high, the sense outputs are not sampled since either writing or associative sensing is occurring in the system, depending upon the state of the word select line 32. For the above condition where either $W_0$ or $W_1$ is high, but not both of these inputs are high, association is performed if the word select line 32 is low. If the word select line 32 is high, writing into the associative memory cell 10 is performed. If both write inputs $W_1$ and $W_0$ are high (using negative logic on these inputs) the sense outputs $S_1$ and $S_0$ will indicate the state of the memory cell 10 if the select line 32 is driven to a predetermined high binary level. The latter condition is indicated in the truth table wherein outputs $S_0$ and $S_1$ are equal to $V_{SAT}$ if the current flowing in one of the bit lines 20 or 22 into the sense-write circuit is greater than the threshold current of the sense amplifier.

Monolithic integrated circuit arrays including both the sense-write circuitry and the associative memory cell described above may be fabricated on a single die. Alternatively, the sense-write and associative memory circuitry may be fabricated on separate dice in certain types of hybrid systems. required.

The system described above requires a minimum of leads (pins) in performing the functions described above each cell requiring normally four leads: the word line, the pair of sense-digit-mask lines and the associative sense line. Such minimization of the number of leads is extremely important when large arrays of memory cells and sense-write circuitry are fabricated. As the number of leads increases, greater and more complex interconnections are required. The latter requirement calls for a larger area per cell and necessitates the use of a more expensive package.

Thus, there has been described an associative memory cell 10 which can be fabricated using a minimum number of transistors and resistors and which requires a minimum amount of space on a semiconductor die. Using present production techniques, arrays of these cells may be constructed on very small semiconductor dice.

We claim:

1. An associative memory cell including, in combination:

a memory circuit portion with first and second transistors, each having four electrodes including two input electrodes for receiving digital logic signals, three of the electrodes of said transistors including one input electrode being cross coupled in a bistable circuit configuration so that said first and second transistors alternately conduct as the memory circuit portion is switched from one to the other of two stable conductive states;

said first input electrodes of said first and second transistors respectively connected to a word select line to which a predetermined potential is applied when the memory cell is selected and when it is desired to either write data into the cell or to sense the binary state of the cell;

said second input electrodes of each of said first and second transistors connected to sense-write input terminals and adapted to receive thereat a potential sufficient in magnitude to change the bistable state of the memory cell when data is written into the cell, and said first and second transistors conducting current through the sense-write terminals to sense circuitry when the conductive state of the cell is read; and association current switch circuit means connected between said first and second transistors and an associative sense terminal, said association current switch circuit means further connected to said sense-write terminals and responsive to the potential at said sense-write terminals and to the conductive state of said first and second transistors to indicate a match or a mismatch between the conductive state of the memory cell and the conductive state of the sense-write circuitry by either conducting current from the associative sense terminal or remaining nonconductive.

2. The associative memory cell defined in claim 1 in combination with a sense-write circuit which is connected via first and second data lines to said second input electrodes of said first and second transistors, respectively, in the associative memory cell, said sense-write circuit providing differential data on said first and second data lines for changing the conductive state of the associative memory cell, and said associative memory cell conducting current through said first and second data lines to said sense-write circuit so that said sense-write circuit is operative to determine the conductive state of said associative memory cell.

3. The combination defined in claim 2 which further includes:

first and second data input terminals connected to said sense-write circuit for receiving binary input signals; and first and second binary output terminals connected to said sense-write circuit for providing output signals in response to potentials on said first and second data lines and to binary signals applied to said first and second input terminals of said sense-write circuit.

4. The memory cell defined in claim 1 wherein:

said association current switch circuit means includes a third transistor connected between said associative sense terminal and said first transistor and conducting current to indicate nonassociation between the bistable state of the memory cell and the bistable state of the sense-write circuitry; and a fourth transistor connected between said associative sense terminal and said second transistor and conducting current to indicate nonassociation between the binary state of said memory cell and the binary state of said sense-write circuitry.

5. The memory cell defined in claim 4 wherein said input electrodes of each of said first and second transistors comprise a first and a second emitter; the base electrodes of the first and second transistors cross connected, respectively, through resistors to the collector electrodes of the second and first transistors to ensure proper bistable operation of said memory circuit.

6. The memory cell defined in claim 5 wherein:

the first emitter of each of the first and second transistors is connected to a word select terminal and receiving thereat a potential sufficient in magnitude to permit the conductive state of the memory cell to be changed, sensed or inhibited; and the second emitter of each of the first and second transistors connected to the base of the third and fourth transistors, respectively, and to the sense-write input terminals so that the conductivity of the first and third transistors is controlled by the potential on the sense-write input terminals and the conductive state of said memory circuit.

7. The memory cell defined in claim 6 which further includes third and fourth resistors connected between a voltage supply terminal and said first and second resistors, respectively, and providing a current path from said voltage supply terminal to said first and second transistors during the operation of the associative memory cell.

8. An associative memory cell including, in combination:

a memory circuit portion with first and second transistors cross coupled in a bistable circuit configuration so that said first and second transistors alternately conduct as the memory circuit portion is switched from one to the other of two stable conductive states;

said first and second transistors each having first and second input electrodes for receiving digital logic signals;

said first input electrodes of said first and second transistors respectively connected to a word select line to which a predetermined potential is applied when the memory cell is selected and when it is desired to either write data into the cell or to sense the binary state of the cell;

said second input electrodes of each of said first and second transistors connected to sense-write input terminals and adapted to receive thereat a potential sufficient in magnitude to change the bistable state of the memory cell when data is written into the cell, and said first and second transistors conducting current through the sense-write terminals to sense circuitry when the conductive state of the cell is read;

association current switch circuit means connected between said first and second transistors and an associative sense terminal, said association current switch circuit means further connected to said sense-write terminals and responsive to the potential at said sense-write terminals and to the conductive state of said first and second transistors to indicate a match or a mismatch between the conductive state of the memory cell and the conductive state of the sense-write circuitry by either conducting current from the associative sense terminal or remaining nonconductive;

said association current switch circuit means includes a third transistor connected between said associative sense terminal and said first transistor and conducting current to indicate nonassociation between the bistable state of the memory cell and the bistable state of the sense-write circuitry;

a fourth transistor connected between said associative sense terminal and said second transistor and conducting current to indicate nonassociation between the binary state of said memory cell and the binary state of said sense-write circuitry;

a first level shifting resistor connected between said first and third transistors and provides a desired DC level shift therebetween during the operation of the memory cell; and a second level shifting resistor connected between said second and fourth transistors and provides a desired DC level shift therebetween during the operation of said memory cell.